Aug. 21, 1956  D. A. CARNEY  2,760,130
DIFFERENTIAL SERVO CONTROL
Filed Jan. 14, 1955  7 Sheets-Sheet 1

INVENTOR.
DUANE A. CARNEY
BY
ATTORNEY

INVENTOR.
DUANE A. CARNEY
BY
ATTORNEY

INVENTOR.
DUANE A. CARNEY
BY
ATTORNEY

INVENTOR.
DUANE A. CARNEY
BY
ATTORNEY

Aug. 21, 1956 D. A. CARNEY 2,760,130
DIFFERENTIAL SERVO CONTROL
Filed Jan. 14, 1955 7 Sheets-Sheet 7

INVENTOR.
DUANE A CARNEY
BY
ATTORNEY

United States Patent Office 2,760,130
Patented Aug. 21, 1956

2,760,130

DIFFERENTIAL SERVO CONTROL

Duane A. Carney, Cedar Rapids, Iowa, assignor to Collins Radio Company, Cedar Rapids, Iowa, a corporation of Iowa Application January 14, 1955, Serial No. 481,744

24 Claims. (Cl. 318—28)

This invention relates generally to differential servo control mechanisms and particularly to an error voltage system utilized in a differential type of servomechanism.

It is sometimes necessary to use a follow-up system which must operate over a wide dynamic range. For example, the output shaft of the system may at times be required to follow the input shaft of the system while the input shaft is moving at an extremely slow rate of speed; and, at other times, the output shaft may be required to follow the input shaft when it is rotating at a very high rate of speed. Differential servo systems of the type described in this specification are advantageous where a wide dynamic range is required.

Difficulty is encountered particularly at extremely slow input speeds with conventional servos utilizng a single motor to drive an output shaft, where the motor must stop rotation when the output shaft is aligned with the input means.

The angle between the input shaft and the output shaft is defined herein as the "lag-angle" of the follow-up system. Thus, the lag-angle is zero in the conventional system when its input and output shafts are aligned and its motor is off.

In the conventional follow-up system, the motor must overcome the static friction of all mechanical parts coupled to it before it can rotate. Accordingly, before its output shaft can be rotated after an input is provided to the system, its error voltage must build-up sufficiently to overcome the static friction associated with the load, the drive motor and its gearing. Since in such systems the error voltage is zero at zero lag-angle and increases with lag-angle, a relatively large lag-angle must exist before sufficient error voltage is provided to overcome the associated static friction. The motor quickly drives the mechanism to zero lag-angle when sufficient error voltage is obtained; and the output shaft must then wait non-rotatively until the input changes sufficiently to build-up enough error voltage to again actuate the motor. Consequently, where the input varies at an extremely slow velocity, the output shaft does not move smoothly but moves in steps or jumps, which occur every time the lag-angle increases to provide sufficient error voltage to overcome the static friction of the motor, gearing and load.

A servo system having its output shaft driven by a differential transmission will overcome much of the friction encountered by the system while the load is stationary. A differential servo system, as the term is used herein, has a pair of motors that drive a load through a differential transmission. Consequently, in a differential type servo, the motors may be maintained in a rotating state while the load-shaft is stationary at zero lag-angle. Thus, there is no static friction associated with the motor and its gearing but only a dynamic friction that must be overcome when the system varies from zero lag-angle. The dynamic friction of both differential motors and their gearing is much smaller than the static friction of a single motor of comparable power and its gearing. Thus, a differential servo system will operate smoothly when its input varies at very small rotational velocities.

The output shaft of a differential servo system begins to rotate whenever the speeds of the two differential motors become unequal. Hence, when an input is provided to the servo system to cause a very small lag-angle, an error sensing means in the system provides unequal values of error voltage to the two motors, which were previously rotating at the same speed, and operates them at different rates of speed in the proper directions to rotate the load-shaft into alignment with the input means.

Furthermore, the differential servo system can operate with much higher input velocities than conventional single motor systems. When the input to a differential servo system varies at a high rate of speed and a large follow-up velocity is required for the load-shaft, the error sensing means of the system provides large driving voltages with selected polarity which drive the motors in directions that cause addition rather than subtraction of their speeds at the output shaft. Therefore, the follow-up velocity provided to the load shaft may be twice the velocity of a single motor system. Consequently, the dynamic range of a differential servo system may be much better than that of the single motor system, because the differential system operates smoothly at much slower input velocities and is capable of operating at much higher input velocities.

It is therefore an object of this invention to provide improved error voltage means for a differential type servo-mechanism.

It is another object of this invention to provide an error voltage system used in conjunction with a differential follow-up system wherein error voltages are controlled in a manner that facilitates operation of the system.

It is still another object of this invention to provide a follow-up system with a wide dynamic range which permits operation of the load-shaft from very small to very large rotational velocities without the introduction of large lag-angles.

It is yet another object of this invention to prevent a step type of follow-up at extremely small input velocities.

It is a further object of this invention to provide a differential servo system which minimizes energy requirements for the output motors of the system when they idle during no-load conditions.

It is a still further object of this invention to provide a differential system which obtains a large urge to the load while the system is operating at relatively small lag-angles.

It is a yet further object of this invention to provide an error voltage system in a differential servo system which operates its output motors in a highly efficient manner while maintaining them in rotation at zero lag-angle.

It is another object of this invention to provide a differential servo system which has a large increase in load-torque with increase in lag-angle.

It is a further object of this invention to provide means for controlling the speed-torque characteristics of the individual motors in a differential servo system over the whole lag-angle range of the system.

It is still another object of this invention to provide a differential type servo system which can provide substantially equal loading on its differential motors over the whole dynamic range.

This invention provides a lag-angle sensing means which has a pair of outputs that are altered in the invention to provide control signals which operate the motors in a differential type servo system.

The lag-angle sensing means used in the invention provides a pair of output voltages that vary sinusoidally in root-mean-square magnitude with variation in lag-angle. The magnitudes of the output voltages are out-of-phase with each other in respect to lag-angle; and in a preferred form of the invention, the magnitudes of the two outputs are ninety degrees out-of-phase with each other.

The lag-angle sensing means may be constructed with conventional devices such as synchros or resolvers. In one type of sensing means using synchros, a single synchro may be used as the generator of the sensing means, and its rotor is mechanically connected to the differentially operated load-shaft of the follow-up system.

A pair of synchros may be used as the receiver of the sensing system, and they have their stator windings connected in parallel to receive the voltage output of the synchro generator. The rotors of the receiver synchros are fixed to the input shaft of the follow-up system and are spaced angularly by ninety electrical degrees. One end of each of the receiver rotors is connected to ground, and the rotors then provide two output voltages with respect to ground.

Since synchros require an alternating source of power, the receiver outputs will alternate at the power line frequency, which may be sixty or four hundred cycles per second. Since the synchro outputs will always have an instantaneous phase that is either in-phase or 180 degrees out-of-phase with the line voltage, the terms, "positive polarity" and "negative polarity" will be used in the specification to indicate these conditions; while the term "phase" will be used to indicate the root-mean-square magniture relationship between the two sensing means output voltages with change in lag-angle. The receiver outputs will therefore have either opposite polarity or the same polarity at zero lag-angle; and either case may be utilized by this invention.

The lag-angle sensing means also may be constructed from resolvers, where a single resolver is used as the sensing means receiver and another resolver is used as the sensing means generator. The rotor of the resolver generator is connected to the load-shaft, and its stator windings are wired to the stator windings of the resolver receiver. The rotor of the receiver has two windings which are spaced angularly by ninety electrical degrees, and a common point between the windings is grounded. Consequently, two outputs are provided with respect to ground from the two receiver windings and may have either opposite polarity or the same polarity at zero lag-angle; whereby either case may be utilized by this invention.

It is desirable at zero lag-angle that the magnitude of the voltages from the two receiver windings in either the resolver system or synchro system be equal, and this situation is assumed in the specification. Otherwise, compensation means must be included in the system to equalize them at zero-lag angle.

While the sensing means is described with particular constructions using resolvers or synchros, where either construction provides two receiver coils spaced by ninety electrical degrees, these are merely preferred forms of the lag-angle sensing system and many other forms may be devised by a person skilled in the art of using the teachings of this specification.

The invention provides a first mixer which substracts the magnitudes of the two output voltages obtained from the sensing means receiver, and the output of the mixer consists of their difference.

Also, second and third mixers are provided by the invention and are used in conjunction with the respective differential motors. The second mixer receives the difference output of the first mixer and also receives one of the sensing means output voltages. It adds the voltages to provide an output signal which drives, after amplification, one of the differential motors.

The third mixer receives the difference output of the first mixer and also receives the other output voltage of the sensing means and subtracts these voltages to provide an output signal which drives, after amplification, the other differential motor.

A pair of rate generators are connected respectively to the differential motors, and they provide outputs to the second and third mixers, respectively, to vary the error voltages in a manner that prevents undesired oscillation or hunting by the differential motors.

Further objects, features and advantages will be apparent to a person skilled in the art upon further study of this specification and its drawings, in which.

Figure 1:
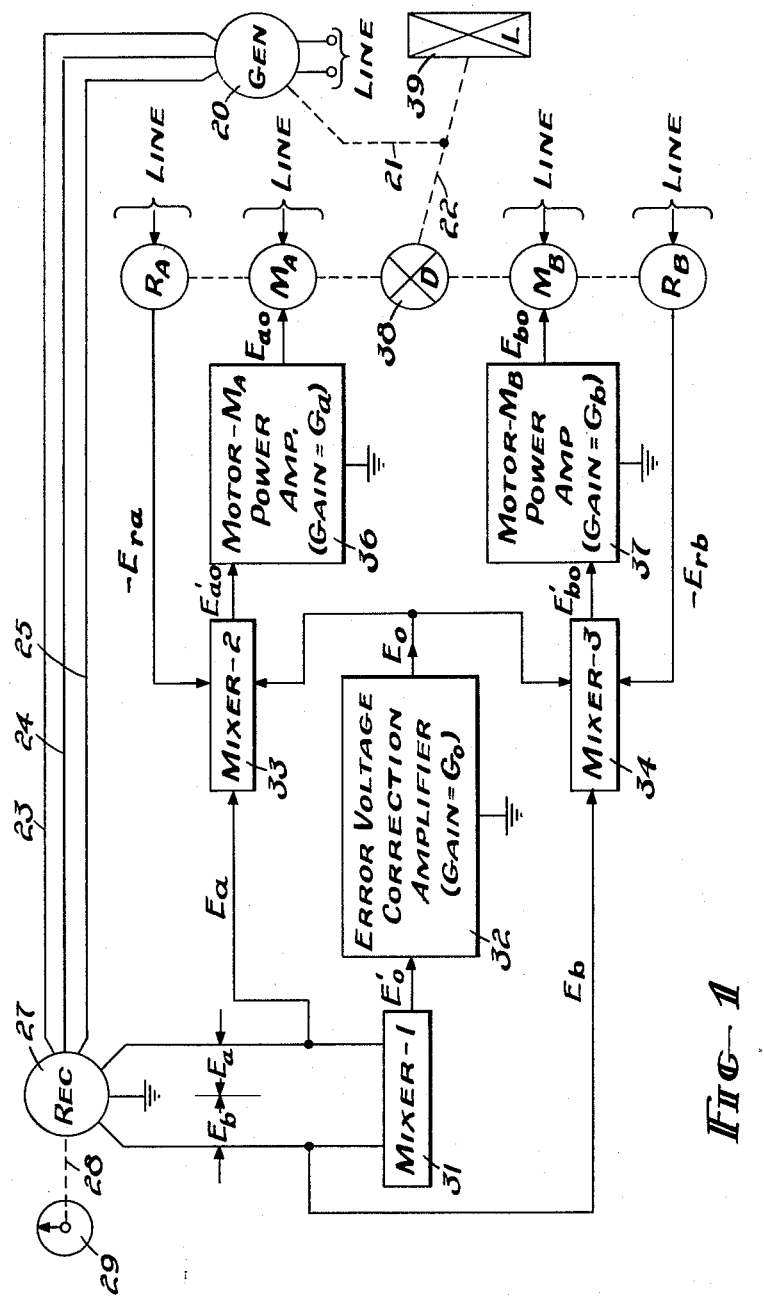
Figure 1 is a block diagram of one form of the invention that utilizes sensing means output voltages having opposite polarity at zero lag-angle.
Figure 2:
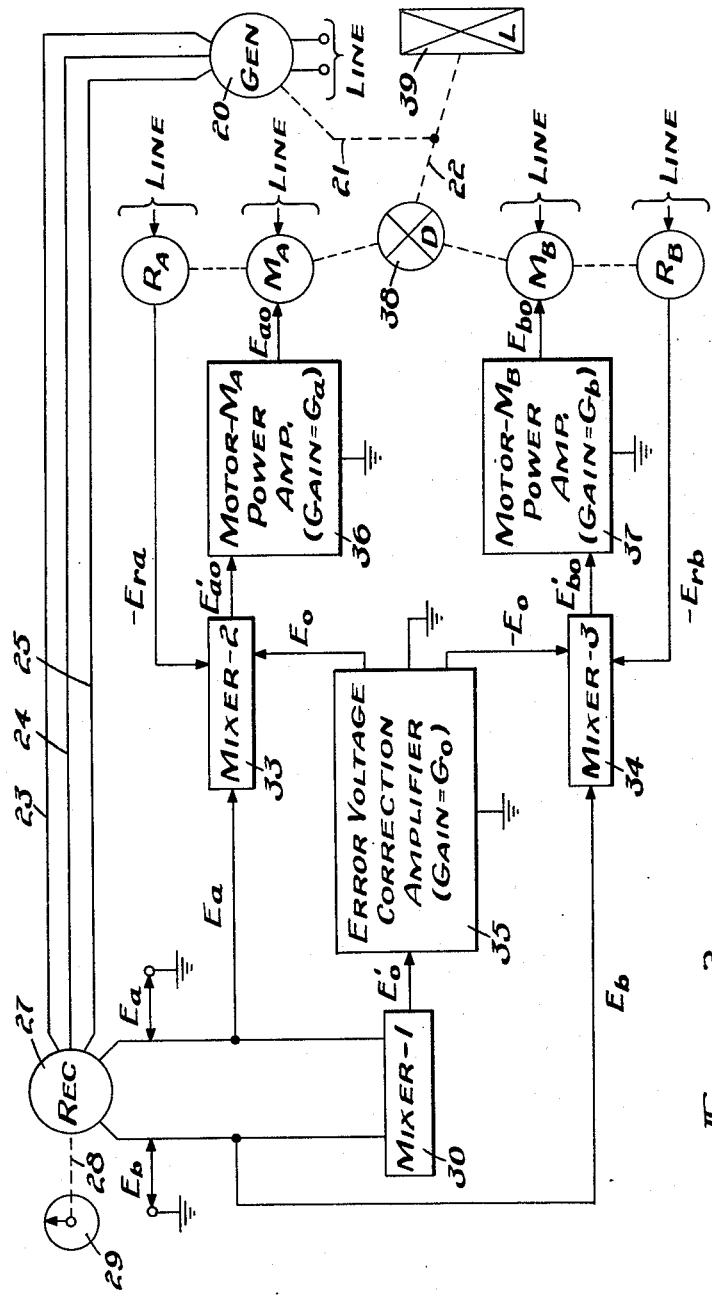
Figure 2 is a block diagram of another form of the invention which utilizes sensing means output voltages having the same polarity at zero lag-angle.

Now referring to the invention in more detail, Figures 1 and 2 show block diagrams of two forms of the invention, in which each has a sensing system that provides a pair of output voltages $E_a$ and $E_b$ that have equal magnitude when the system is at zero lag-angle, as will be described below in detail.

Figures 1 and 2 show a generator 20 of the sensing means which has a rotor shaft 21 coupled either directly or through a transmission, depending on the particular application of the system, to the load-shaft 22 of the servo system. Generator 20 provides an output signal which is transmitted by wires 23, 24, and 25 to the receiver 27 of the sensing means. A rotor shaft 28 of receiver 27 is coupled to an input means 29, which may be the ouput of another servo system but, for simplicity, is assumed herein to be manually controlled. An alternating voltage power source, designated as "line," provides power to the sensing means and may be a sixty or four hundred cycle per second power source.

The form of the invention shown in Figure 1 provides receiver output control voltages $E_a$ and $E_b$ which have opposite polarity at zero lag-angle. A first mixer 31 is connected to receiver 27 and receives voltages $E_a$ and $E_b$. Mixer 31 provides an output voltage, designated as $E_o'$, which adds voltages $E_a$ and $E_b$ and is expressed mathematically by the following formula:

$$E_o' = E_a - E_b \quad (1)$$

Voltage $E_b$ has a negative sign because of its opposite polarity from voltage $E_a$.

An error voltage correction amplifier 32 is connected to receive the output $F_o'$ of first mixer 31. Amplifier 32 has a gain, designated as $G_o$, and provides an output $E_o$ which may be defined mathematically by the following formula:

$$E_o = G_o E_o' \quad (2)$$

The gain $G_o$ of amplifier 32 may be any value but for purposes of explanation herein is assumed to be unity.

A second mixer 33 and a third mixer 34 are provided, and each is connected to the output of amplifier 32 to receive voltage $E_o$. Also, second mixer 33 is connected to one side of sensing means receiver 27 to receive voltage $E_a$ and is further connected to receive the output of a rate generator $R_A$, from which a rate signal, designated as $E_{ra}$, is received.

Second mixer 33 provides an output designated as $E_{ao}'$ which may be defined by the formula:

$$E_{ao}' = E_a + E_o - E_{ra} \qquad (3)$$

A first power amplifier 36 is connected to the output of second mixer 33 to receive voltage $E_{ao}'$. It amplifies voltage $E_{ao}'$ by a gain $G_a$ and provides an output voltage $E_{ao}$, which is defined mathematically as:

$$E_{ao} = G_a E_{ao}' \qquad (4)$$

Similarly, third mixer 34 is connected to the opposite side of receiver 27 to receive sensing means voltage $E_b$ and is connected to a rate generator $R_B$, from which a rate signal, designated as $E_{rb}$, is received. The rate generators receive excitation voltage from the line.

Hence, third mixer 34 provides an output, designated as $E_{bo}'$, which may be defined by the formula:

$$E_{bo}' = E_b - E_o - E_{rb} \qquad (5)$$

It is noted that $E_o$ has a minus sign before it which is caused by the fact that $E_b$ and $E_o$ have their magnitudes substracted in the systems of Figures 1 and 2.

A second power amplifier 37 is connected to the output of third mixer 34 to receive voltage $E_{bo}'$. It amplifies voltage $E_{bo}'$ by a gain $G_b$ to provide an output voltage $E_{bo}$, which is defined mathematically as:

$$E_{bo} = G_b E_{bo}' \qquad (6)$$

A differential transmission device 38 is driven by the two motors $M_A$ and $M_B$ and has its ouput connected to load-shaft 22 which drives a load 39. First motor $M_A$ is assumed to be a two-phase motor and has one of its field windings connected to the output of first power amplifier 36 to receive voltage $E_{ao}$. The other field winding of motor $M_A$ is connected to the line source.

Similarly, second motor $M_B$ is also assumed to be a two-phase motor, and one of its field windings is connected to the output of second power amplifier 37 to receive voltage $E_{bo}$. The other field winding of motor $M_B$ also is connected to the line source. Phase-shift means (not shown) will generally be required in the circuit of one of the field windings of each motor to maintain a ninety degree phase relationship between the field excitations of each motor.

Figure 2 shows another form of the invention, which is different in a few respects from Figure 1. Component items which may be constructed the same way in either Figure 1 or Figure 2 are given the same reference numeral in both figures. Receiver 27 in Figure 2 provides voltages $E_a$ and $E_b$ which have the same polarity with respect to ground at zero lag-angle rather than the opposite polarity of Figure 1. Receiver 27 is connected to a first mixer 30 which provides an output $E_o'$ that is equal to the difference between the input signals $E_a$ and $E_b$ and may be represented mathematically by Formula 1. However, mixer 30 in Figure 2 is different from mixer 31 in Figure 1 because mixer 31 adds voltages $E_a$ and $E_b$ while mixer 30 subtracts them. Nevertheless, the reversal in polarity of voltage $E_b$ in Figures 1 and 2 permits Formula 1 to apply in each case.

Voltage $E_o'$ in Figure 2 is then fed into a correction amplifier 35 which provides a balanced output of equal voltages $E_o$ and $-E_o$. Thus, mixer 35 is different than mixer 32 in Figure 1 in that mixer 32 provides an unbalanced output.

A second mixer 33 is connected to the output of amplifier 35 to receive positive voltage $E_o$. Mixer 33 also receives voltage $E_a$ from receiver 27 and receives the voltage $E_{ra}$ from a rate generator $R_A$, and mixer 33 provides an output voltage $E_{ao}'$ which is defined mathematically by Formula 3, given above.

A third mixer 34 is connected to the other side of amplifier 35 to receive its negative output voltage $-E_o$. Mixer 34 is also connected to sensing means receiver 27 to receive voltage $E_b$ and is connected to rate generator $R_B$ to receive voltage $E_{rb}$. These voltages are added by mixer 34 to provide an output voltage $E_{bo}'$ which is mathematically given above by formula 5.

The sensing means in Figures 1 and 2 provide output voltages $E_a$ and $E_b$ that vary in magnitude sinusoidally with variation in the lag-angle of the servo system, which is the angle between load-shaft 22 and input shaft 28. Zero lag-angle is arbitrarily set to indicate a chosen angular relationship between input shaft 22 and output shaft 28.

The sensing means may utilize synchrous or resolvers which provide output voltages that alternate at the line rate, which might be for example, sixty or four hundred cycles per second. The instantaneous phase of voltages $E_a$ and $E_b$, which has the two conditions of in-phase and 180 degrees opposite phase with the line voltage, is expressed herein as positive polarity or negative polarity.

The sinusoidal variations with lag-angle of the magnitudes of voltages $E_a$ and $E_b$ are displaced phase-wise with respect to each other in this invention; and, in the preferred form of the invention described in this specification, they are displaced phase-wise by ninety degrees.

Figure 6:
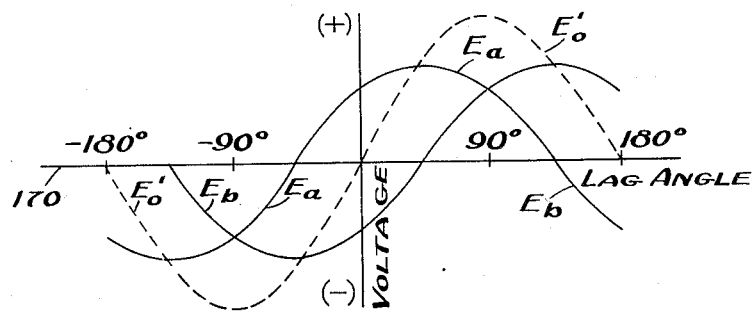
Figure 6 illustrates the variation in magnitudes of the component error voltages with variation of lag-angle in one form of the invention.

Figure 6 illustrates the variation with lag-angle of voltages $E_a$ and $E_b$ in regard to the form of the invention shown in Figure 1. Curve $E_a$ shows the variation of magnitude of voltage $E_a$, and curve $E_b$ shows the variation of magnitude of voltage $E_b$.

Figure 7:
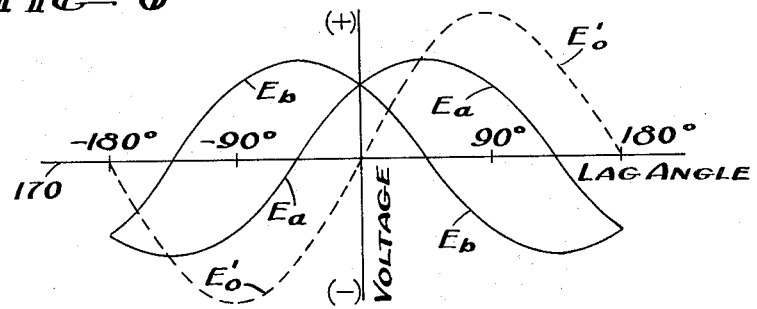
Figure 7 illustrates the variation in magnitudes of the component error voltages with variation of lag-angle in another form of the invention.

Figure 7 illustrates the variation with lag-angle of voltages $E_a$ and $E_b$ in regard to the form of the invention in Figure 2. Curves $E_a$ and $E_b$ in Figure 7 are similar to the curves shown in Figure 6 except that the $E_b$ curve is inverted to show its reversal in polarity.

It is noted that when voltages $E_a$ and $E_b$ are equal at zero lag-angle, their difference $E_o'$ is zero. Thus, in the above formulas 3 and 4, the $E_o$ term will be zero, and if the rate voltages $E_{ra}$ and $E_{rb}$ are assumed to be zero, the magnitudes of voltages $E_{ao}'$ and $E_{bo}'$ will be equal to provide equal voltages to motors $M_A$ and $M_B$ which will cause them to rotate at equal speeds in the proper direction to maintain load-shaft 22 non-rotating.

However, when the lag-angle changes from zero, voltages $E_a$ and $E_b$ are unbalanced to provide a voltage $E_o$ which will have a magnitude other than zero and a polarity that depends upon which receiver voltage is greater than the other. Consequently, voltages $E_{bo}'$ are no longer equal since voltage $E_o$ adds to voltage $E_a$ in Formula 3 and voltage $E_o$ subtracts from voltage $E_b$ in Formula 4. Thus, the voltages provided to the motor are different; and they will rotate at different speeds which causes load-shaft 22 to rotate in the direction of minimum lag-angle.

Figure 3:
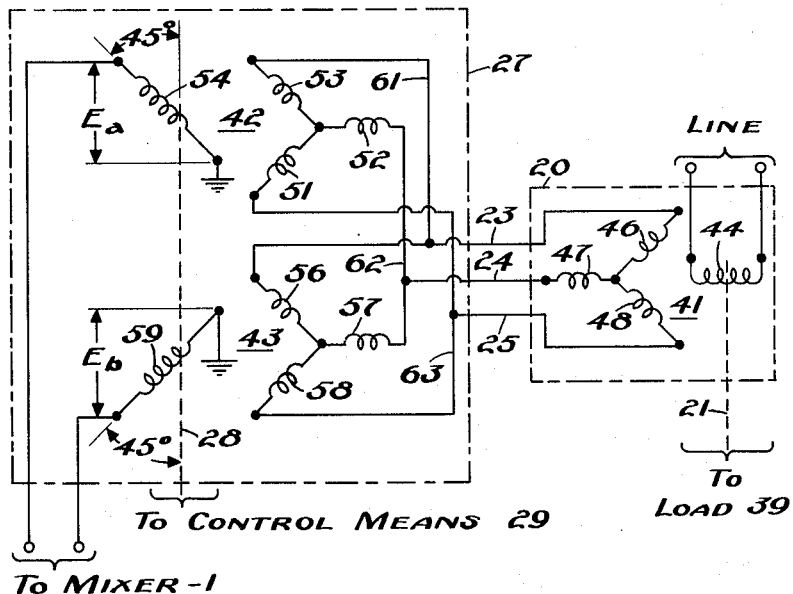
Figure 3 is a schematic diagram of one type of sensing means that may be used in the invention.

Figure 3 shows one type of sensing means that may be used in the invention. It has a single synchro 41 used as the sensing means generator 20 and has a pair of synchros 42 and 43 used as the sensing means receiver 27. The rotor 44 of generator synchro 20 is connected to shaft 21 which is coupled to servo system output shaft 22. The stator windings 46, 47, and 48 of generator 20 are connected by means of wires 23, 24, and 25 to synchro receiver 27. First receiver synchro 42 has stator windings 51, 52 and 53, while the other receiver synchro 43 has stator windings 56, 57, and 58; and they are connected in parallel by conductors 61, 62, and 63, which are connected respectively to carrier wires 23, 24, and 25, respectively. The rotor 54 of synchro 42 is grounded at one end and provides voltage $E_a$ with respect to ground. Similarly, the rotor 59 of synchro 43 is also grounded at one end and provides voltage $E_b$ with respect to ground.

The rotors 54 and 59 of receiver synchros 42 and 43 are fixed to servo system input shaft 28 and spaced angularly by ninety electrical degrees. The term "electrical degrees" refers herein to the angular position of a sensing means rotor with respect to the field provided by its stator, wherein ninety electrical degrees of rotor rotation will change its output from zero to a maximum.

Thus, in Figure 3, as input shaft 28 is rotated, rotor coils 54 and 59, which are spaced by ninety electrical degrees, will have four positions where the output voltages $E_a$ and $E_b$ of the two coils have equal magnitude. In two of the four positions, the voltages will have opposite polarity and in the remaining two positions the voltages will have the same polarity. Any of these four shaft positions may be used in the invention to indicate zero lag-angle, although some differences in the general circuitry of the servo system are required in regard to some of these positions. For example, the two positions providing opposite polarity will utilize circuitry according to Figure 1, and the two positions providing the same polarity will utilize circuitry according to Figure 2.

Another sensing means that may be used in the invention is described with reference to Figure 4 which utilizes resolvers rather than synchros. In this case, a resolver 71 is used as generator 20 of the sensing means; and it has a rotor 72 coupled to servo load-shaft 21. Its stator has two coils 73 and 74, spaced angularly ninety electrical degrees from each other, which provide the generator output to wires 23, 24, and 25 that connect to the coils.

Another resolver 76 is used as receiver 27 of the sensing system; and it has stator windings 77 and 78, which are also spaced angularly by ninety degrees and are connected to carrier wires 23, 24, and 25. The rotor of receiver resolver 76 has two windings 79 and 81 fixed to control shaft 28 and are also spaced angularly by ninety electrical degrees. They have a common connection 82 that is grounded; and coil 79 provides output voltage $E_a$ with respect to ground, while the other rotor coil 81 provides output voltage $E_b$ with respect to ground.

The resolver sensing means also has four rotor positions where voltage $E_a$ and $E_b$ are equal in the same manner as the synchro receiver of Figure 3. Thus, the circuitry of Figures 1 and 2 apply in the same manner.

Other arrangements of synchros and resolvers meeting the requirements of the sensing means described in this specification may be devised, in which a pair of output voltages are provided that have equal magnitudes at zero lag-angle. For example, resolvers having single rotor coils may be connected in a manner that is similar to the connection of receiver synchros 42 and 43 in Figure 3. Their stator windings would be connected in parallel to the carrier wires 23, 24, and 25; and similarly, their rotor windings would be fixed to input shaft 28 and would be spaced angularly by ninety electrical degrees with one end of each rotor coil connected to ground. Hence, one rotor will provide voltage $E_a$ and the other rotor will provide $E_b$.

Figure 4:
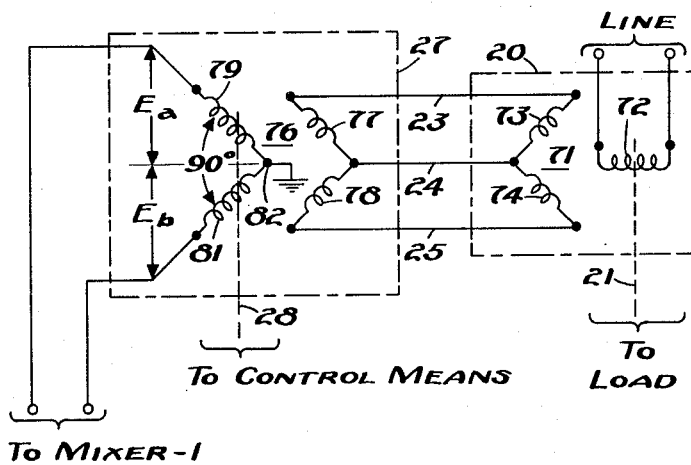
Figure 4 is a schematic diagram of another type of sensing means which may be used in the invention.

Furthermore, the sensing means described in regard to Figures 3 and 4 will operate equally well if the mechanical connections of generator 20 and receiver 27 to load-shaft 21 and input shaft 28 are reversed. For example, generator load shaft 21 might instead be connected to input means 29 and receiver shaft 8 might instead be connected to the load 39. Voltages $E_a$ and $E_b$ will then vary in the same manner as described above to provide the output of the sensing means.

Figure 5:
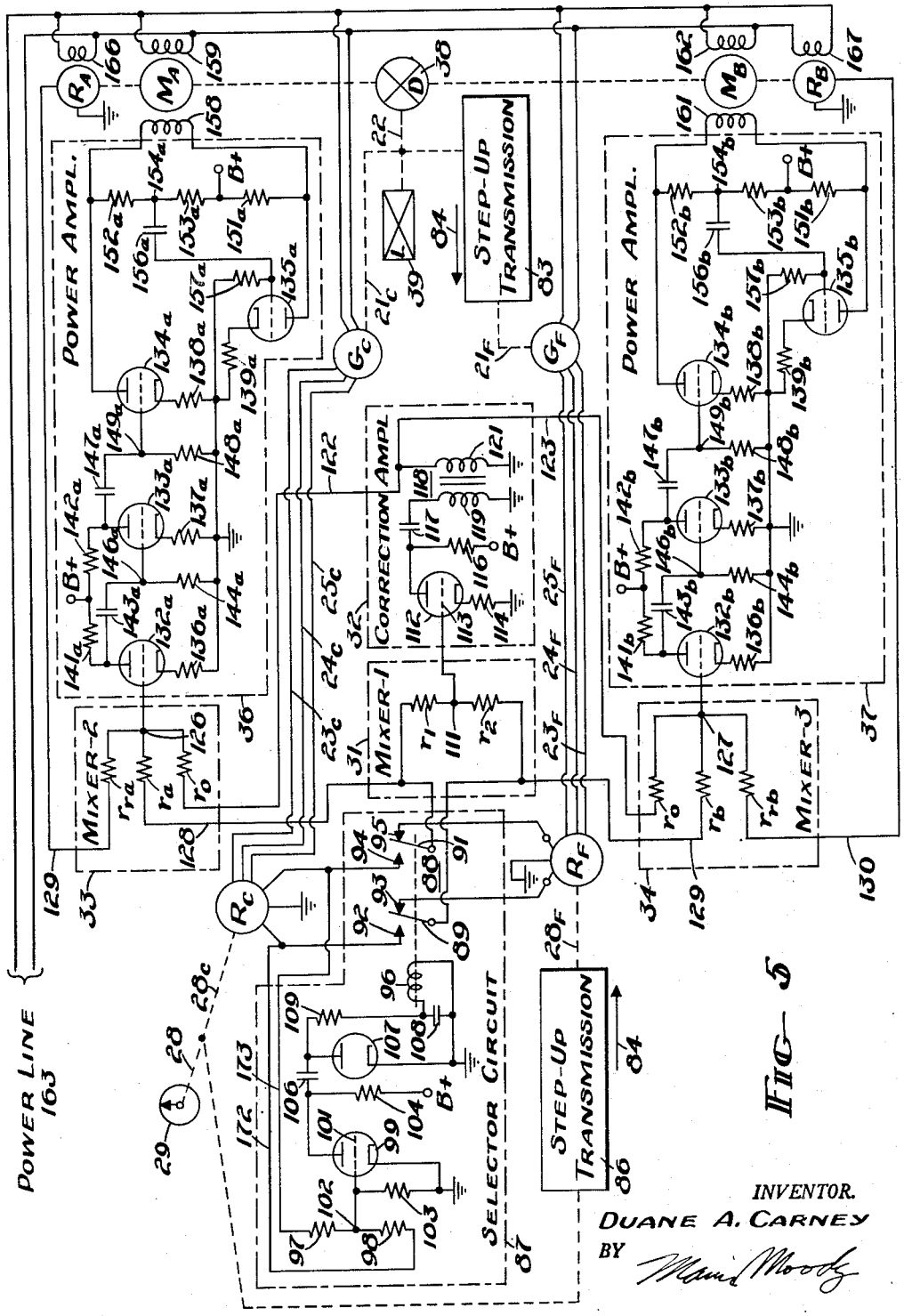
Figure 5 is a detailed schematic diagram of one form of the invention with fine and coarse control and automatic means for selecting the one suited to the lag angle.

Figure 5 shows a detailed schematic diagram of the invention incorporating both fine and coarse sensing means to provide maximum versatility of the system over a very large dynamic range; whereby the coarse sensing means is used when the lag-angle is large and the fine sensing means is used when the lag-angle is small.

The detailed circuitry in Figure 5 complies with the block diagram of Figure 1, except for the addition of a second sensing means and a switching circuit. The switching circuit selectively connects the outputs of the two sensing means to the follow-up system to provide coarse and fine control over the load. Thus, equivalent block components in Figure 5 will have the same reference numeral as their counterpart in Figure 1. Items relating to the coarse sensing means will have C appended to them, and items relating to the fine sensing means will have F appended to them.

The coarse sensing means comprises a generator $G_C$ and a receiver $R_C$; and the fine sensing means similarly includes a generator $G_F$ and a receiver $R_F$. In the coarse sensing means, generator $G_C$ has its rotor shaft $21_C$ connected directly and mechanically to load-shaft 22, and its receiver $R_C$ has its rotor connected directly and mechanically to input shaft 28. Wires $23_C$, $24_C$, and $25_C$ connect coarse generator $G_C$ to coarse receiver $R_C$.

Generator $G_F$ of the fine sensing means has its rotor shaft $21_F$ connected to output shaft 22 through a step-up transmission 83, which causes the rotor of generator $G_F$ to revolve at a higher velocity than load-shaft 22. The direction of velocity step-up is indicated by arrows 84. Also, receiver $R_F$ of the fine sensing means has its rotor shaft $28_F$ connected to input shaft 28 through another step-up transmission 86, which causes the rotor of receiver $R_F$ to revolve at a higher velocity than input shaft 28. Transmissions 83 and 86 may be gear trains, and they have the same step-up ratio. Fine receiver $R_F$ is connected by wires $23_F$, $24_F$, and $25_F$ to fine generator $G_F$.

Although the coarse sensing means is directly coupled in the servo system and the fine sensing system is coupled by a step-up means to the system, these manners of coupling are arbitrary to some extent. However, the rotors in the fine sensing system must be coupled to the input and output shafts with a greater step-up ratio than the rotors in the coarse system. Thus, either or both of the sensing systems may be coupled by transmission means to the input and load.

A sensing means selector circuit 87 automatically selects which of the sensing means should be used at a particular time. Selector circuit 87 includes a double-pole, double-throw switch 88 that has poles 89 and 91 and contacts 92, 93, 94, and 95. First pole 89 switches between contacts 92 and 93; and second pole 91 switches between contacts 94 and 95. Switch 88 is biased normally so that poles 89 and 91 engage contacts 93 and 95 to connect the fine sensing means into the servo system. Poles 93 and 95 are actuated by a relay 96 which is controlled by the output of coarse receiver $R_C$.

A pair of resistors 97 and 98 are connected serially across the output terminals of coarse receiver $R_C$. An electron tube 99 has its control grid 101 connected to the intermediate point 102 between resistors 97 and 98, which have equal value. The cathode of tube 99 is connected to ground; and a grid-leak resistor 103 is connected between ground and the control grid of tube 99. A plate resistor 104 is connected between the plate of tube 99 and a B plus voltage source. A blocking capacitor 106 is connected on one side to the plate of triode 99; and a diode 107 has its plate connected to the other side of capacitor 106 and has its cathode connected to ground. Relay 96 has one side grounded, and a second capacitor 108 is connected across relay 96. A resistor 109 is connected between the plate of diode 107 and the ungrounded side of relay 96.

First mixer 31 comprises a pair of resistors $r_1$ and $r_2$ which have equal value and are connected in series with one outer end connected to pole 89 of switch 88 and the opposite end connected to the other pole 91.

Correction amplifier 32 receives the output of first mixer circuit 31 which is taken from the common connection point 111 between resistors $r_1$ and $r_2$. Correction amplifier 32 has an electron discharge tube 112 which has its control grid 113 connected to point 111 in first mixer 31. A cathode resistor 114 is connected between ground and the cathodes of tube 112, while a plate resistor 116 is connected between the plate of tube 112 and the B plus source. A blocking capacitor 117 is connected on one side to the plate of tube 112. A transformer 118 has its primary 119 connected at one end to ground and connected at the other end to the remaining side of condensor 117. The secondary 121 of transformer 118 has one side connected to ground; and its other side provides the unbalanced output voltage $E_o$ previously described in connection with Figure 1.

The output voltage $E_o$ of secondary 121 is provided to second mixer 33 by a lead 122 and to third mixer 34 by another lead 123. Second mixer 33 has three resistors $r_o$, $r_a$, and $r_{ra}$ which are connected together at point 126, and third mixer 34 has three resistors $r_o$, $r_b$, and $r_{rb}$ which are connected together at point 127.

In second mixer 33, the remaining end of resistor $r_o$ is connected to lead 122 to receive voltage $E_o$. Another lead 128 connects the other end of resistor $r_a$ to pole 91 to receive voltage $E_a$; and rate generator $R_A$ provides its output voltage $E_{ra}$ to second mixer 33 by means of a lead 129 which connects to third resistor $r_{ra}$.

Similarly, in third mixer 34, resistor $r_o$ is connected to lead 123 to also receive voltage $E_o$; resistor $r_b$ is connected to the other pole 89 by lead 129 to receive voltage $E_b$; and resistor $r_{rb}$ is connected to the other rate generator $R_B$ by lead 130 to receive voltage $E_{rb}$.

The summation voltage $E_{ao}'$ of the input signals to second mixer 33 is provided at point 126 to power amplifier 36; while the summation voltage $E_{bo}'$ of the input signals to third mixer 34 is provided at point 127 to power amplifier 37.

Power amplifiers 36 and 37 are each preferably constructed in the same manner. Thus, the same numerical designations are used for like components in each power amplifier; but the suffix "a" is added to numerals for components in first power amplifier 36 and the suffix "b" is added to like reference numerals in second power amplifier 37.

Power amplifiers 36 and 37 are comprised of several stages of conventional amplifiers with a push-pull final stage. Each power amplifier has a first tube 132 with its control grid connected to one of the respective output points 126 or 127 of mixers 33 and 34 to receive voltages $E_{ao}'$ and $E_{oo}'$, respectively. A second tube 133 provides an intermediate amplification stage, and final tubes 134 and 135 provide a final push-pull stage. Resistors 136, 137, 138, and 139 are connected between ground and the cathodes of tubes 132, 133, 134, and 135, respectively. Tubes 132 and 133 have the respective plate resistors 141 and 142 connected between their respective plates and the B plus sources. A capacitor 143 is connected serially to a resistor 144 between the plate of tube 132 and ground; and their common point 146 is connected to the control grid of tube 133. Similarly, a capacitor 147 is connected in series to a resistor 148 between the plate of intermediate tube 133 and ground; and their intermediate point 149 is connected to the control grid of tube 134.

Push-pull tubes 134 and 135 have equal plate resistances. Plate resistor 151 is connected between the plate of tube 135 and the B plus source, and plate resistors 152 and 153 are serially connected between the plate of the other tube 134 and the B plus source. Resistors 152 and 153 are proportioned for phase-inverting purposes to provide a signal of opposite phase to the control grid of the other push-pull tube 135, which is connected to the intermediate point 154 through a capacitor 156. A grid-leak resistor 157 is connected between ground and the grid of tube 135.

Differential 38 may be a conventional differential gear transmission where the rotational velocity of its output shaft 22 is the difference between the rotational velocities of two driving motors $M_A$ and $M_B$. The transmission may be designed so that the driving motors rotate either in the same direction or in opposite directions to maintain the load-shaft non-rotative.

In this embodiment, differential motors $M_A$ and $M_B$ are two-phase motors where motor $M_A$ has field windings 158 and 159 and motor $M_B$ has field windings 161 and 162. Motor $M_A$ has one field winding 158 connected between the plates of tubes 134a and 135a, and its other field winding 159 is connected across a power line 163, which provide both alternating power and a polarity (phase) reference for the follow-up system. Similarly, motor $M_B$ has winding 161 connected between the plates of tubes 134b and 135b, while winding 161 is connected to the power line 163. Phase-adjusting means (not shown) are provided in tandem with one of the windings of each motor to maintain the ninety degree instantaneous phase relationship between the fields of each motor.

Rate generator $R_A$ is coupled mechanically to first motor $M_A$ and has a single field winding 166 which is connected across power line 163. Similarly the other rate generator $R_B$ is coupled mechanically to second motor $M_B$ and has a field winding 167, which is also connected across the power source 163. The rate generators $R_A$ and $R_B$ provide separate signals $E_{ra}$ and $E_{rb}$ that are dependent only on the rate of change of velocity of the respective motors $M_A$ and $M_B$. These signals are combined with the error voltages in second and third mixers 33 and 34 and alter the error signal in a manner that prevents undesired oscillation or hunting by motors $M_A$ and $M_B$ to thus prevent oscillation or hunting by load-shaft 22. The outputs of the rate generators must be adjusted in amplitude and phase in a well known manner to perform properly in the system.

The lag-angle sensing means of the servo system is arranged, as described above in regard to Figures 3 and 4, to provide voltages $E_a$ and $E_b$ that have equal magnitude at zero lag-angle. These voltages vary sinusoidally in magnitude with lag-angle but, in regard to the lag-angle variable, are ninety degrees out of phase with each other. Nevertheless, voltages $E_a$ and $E_b$ also alternate at the frequency of line source 163; and they have an instantaneous phase that is either in-phase or 180 degrees out-of-phase with line voltage, which provides a reference voltage. The two instantaneous phase conditions are called, as stated above, "positive polarity" and "negative polarity;" while the term "phase" is restricted herein to the magnitude variations of voltages $E_a$ and $E_b$.

In Figures 6 and 7, voltages $E_a$ and $E_b$ have positive polarity when above lag-angle abscissa 170 and have negative polarity when below lag-angle abscissa 170. Figure 6 illustrates the gamut of voltages $E_a$ and $E_b$ in the form of the invention shown in Figure 2. It is noted at zero lag-angle in Figure 6 that voltages $E_a$ and $E_b$ have the same polarity as required in Figure 1.

Figures 6 and 7 also illustrate the variation of voltage $E_o'$ which is defined by Formula 1 above in terms of voltages $E_a$ and $E_b$. It is noted at zero lag-angle that $E_o'$ is zero in both figures and that, at lag-angles other than zero, curve $E_o'$ varies in the same manner in both Figures 6 and 7. This is due to the addition of voltages $E_a$ and $E_b$ by first mixer 31 in Figure 1 and to the subtraction of voltages $E_a$ and $E_b$ in first mixer 30 in Figure 2.

Figure 8:
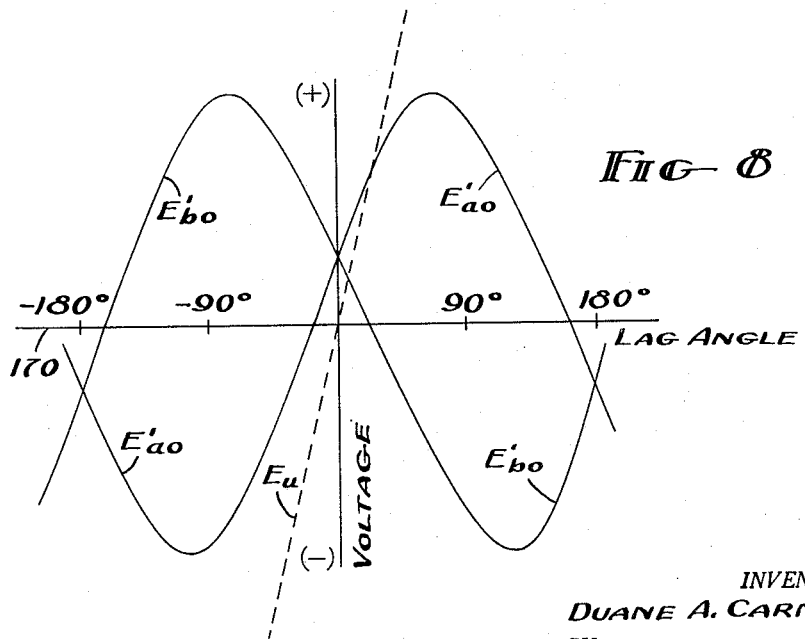
Figure 8 illustrates the variation with lag-angle of the magnitudes of the composite signal voltages provided to the differential motors in one form of the invention.

Figure 8 illustrates the form of the error voltages (neglecting the rate generator signals) supplied to the motors $M_A$ and $M_B$ in Figure 1. Voltages $E_{ao}'$ and $E_{bo}'$ are shown but they have the same form as amplified voltages $E_{ao}$ and $E_{bo}$. Composite voltages $E_{ao}'$ and $E_{bo}'$ result from the operation of the first, second, and third mixers and are defined by Formulas 3 and 5.

It is observed in Figure 8, that, as the lag-angle increases from zero in a positive direction, voltage $E_{ao}'$ increases in a positive manner to reach its peak shortly before ninety degrees of positive lag-angle, while $E_{bo}'$ decreases in a negative manner to reach its peak slightly after ninety degrees of positive lag-angle.

On the other hand, when the lag-angle is negative in Figure 8, composite voltage $E_{bo}'$ increases in a positive manner and reaches a peak shortly before ninety degrees negative lag-angle; while voltage $E_{ao}'$ decreases to reach a negative peak shortly after ninety degrees negative lag-angle.

The direction of rotation of motors $M_A$ and $M_B$ is determined by the polarity of voltages $E_{ao}'$ and $E_{bo}'$. It is presumed in the described embodiment that at zero lag-angle motors $M_A$ and $M_B$ rotate at equal speeds in directions that maintain output shaft 22 non-rotative. Thus, the differential drive mechanism can be constructed so that voltages $E_{ao}'$ and $E_{bo}'$, having the same polarity at zero lag-angle as shown in Figure 8, will drive the differential to maintain output shaft 22 non-rotative.

Differential output shaft 22 is rotated in one direction when the lag-angle is positive in Figure 8 and is rotated in the opposite direction when the lag-angle is negative. This is caused by the change of motor velocities due to the variation in voltages $E_{ao}'$ and $E_{bo}'$ with lag-angle. Each motor reverses its direction of rotation when its input voltage reverses polarity to provide a wide range of control over load 39.

The urge to differential output shaft 22 is dependent upon the speed and rotational directions of both motors $M_A$ and $M_B$. The urge is designated as $E_u$ and is dependent upon the difference between the composite voltages $E_{ao}$ and $E_{bo}$ and is defined by the formula:

$$E_u = E_{ao} - E_{bo} \quad (7)$$

Voltage $E_u$ provides a hypothetical figure which is useful in evaluating the output of a differential servo system. It is plotted as the dotted curve $E_u$ in Figure 8.

The polarity of curve $E_u$ controls the direction of rotation of load-shaft 22, and its amplitude controls the amount of torque provided to load-shaft 22. Curve $E_u$ is positive at positive lag-angles to cause output shaft 22 to rotate at one rotational direction for positive lag-angles; and curve $E_u$ is negative at negative lag-angles to cause output shaft 22 to rotate in the opposite rotational direction for negative lag-angles. Thus, the differential output shaft is maintained acutely sensitive to the variation in lag-angle and will align itself with servo input shaft 28 in the shortest direction possible.

The detailed embodiment shown in Figure 5 provides a follow-up system which has both coarse and fine sensing means to increase the dynamic range of the follow-up system. When a very small lag-angle occurs between load-shaft 22 and input shaft 28, which for example, might be under three degrees, the fine sensing system operates to maintain the system at zero lag-angle, since the fine sensing means is normally engaged in the follow-up system. However, if a large change in input should suddenly occur to cause a large lag-angle, which might, for example, be greater than three degrees, the fine sensing means is disengaged by selector circuit 87 and the coarse sensing means is engaged.

Step-up transmissions 83 and 86, used in the fine sensing means, cause an "internal lag-angle" in the fine sensing means. The term "internal lag-angle" is defined herein as the lag-angle between the rotors of fine generator $G_F$ and receiver $R_F$, which is a multiple, greater than one, of the "actual lag-angle" of the servo system. The term "actual lag-angle" is defined herein as the lag-angle between load-shaft 22 and input shaft 28 and in the lag-angle previously referred to in this specification. Hence, three degrees of actual lag-angle might, for example, cause thirty-degrees of internal lag-angle in the fine sensing means. The lag-angle abscissas 170 in Figures 6 and 7 refer to actual lag-angle when they are applied to the coarse sensing means and refer to internal lag-angle when they are applied to the fine sensing means. Thus, when direct coupling is used, as in Figures 1 and 2 in the coarse sensing means of Figure 5, the internal lag-angle equals the actual lag angle. Consequently, if large velocity changes occur at input shaft 28 which would cause ambiguity in the internal lag-angle of the fine sensing system, the slower acting coarse sensing system is automatically engaged to control the follow-up system.

The detailed operation of selector circuit 87 follows: The input leads 172 and 173 connect the input of selector circuit 87 to the output terminals of coarse receiver $R_C$; and resistors 97 and 98 are serially connected by leads 172 and 173 across the output terminals. A voltage is provided at intermediate point 102 which is the difference between voltages $E_a$ and $E_b$, and therefore varies as voltage $E'_o$ in Figure 6, which is zero at zero lag-angle. This voltage is received and amplified by tube 99 and is rectified by diode 107, which provides a direct-current to relay 96 that is proportional to voltage $E'_o$ of coarse receiver $R_C$. This direct current actuates switch 88 to connect the coarse sensing means into the servo system when the coarse receiver voltages become greatly unbalanced in magnitude. Coarse receiver output is used because it is proportional to actual lag-angle.

The poles of switch 88 are biased by suitable springs (not shown) to normally connect the fine sensing means to the servo system when the actual lag-angle is within, for example, three degrees of actual lag-angle from zero, since the output of the coarse receiver is substantially balanced within this range of actual lag-angle. Thus, when the actual lag-angle becomes large, the unbalance of the coarse receiver voltages becomes large; and relay 96 receives a sufficient amount of direct-voltage actuation to switch poles 89 and 91 to connect coarse receiver $R_C$ to the servo system and, at the same time, disconnect fine receiver $R_F$.

The differential motors $M_A$ and $M_B$ in Figure 5 are therefore controlled by the automatic setting of switch 88 in selector circuit 87. Component voltages $E_a$, $E_b$ and $E_o$, which are supplied to second mixer 33 and third mixer 34, are therefore dependent upon the setting of switch 88. Hence, the inputs to leads 122 and 123, which supply voltages $E_a$ and $E_b$ to the second and third mixers, have their inputs switched by selector circuit 87 between the coarse and fine sensing means. Therefore, differential motors $M_A$ and $M_B$ are controlled in Figure 5 by either the fine or coarse sensing systems according to the unbalancing of the coarse receiver output voltages.

Particular operational characteristics are obtained for differential type of follow-up systems by the invention due to its method of treating the output voltages of the sensing means.

The operational characteristics of the invention may be better understood by explaining them on a comparison basis. For example, a comparison of operational characteristics may be made between: (1) a differential follow-up system not having a first mixer 30 or 31 or a correction amplifier 32 or 35; and (2) a follow-up system of the type explained in connection with Figures 1 and 2.

A follow-up system without a first mixer and a correction amplifier is illustrated in block form by Figure 11, and will be referred to as the "simplified system"; while the systems illustrated by Figures 1 and 2 will be referred to as the "corrected system." Thus, the unexpected advantages obtained by using a first mixer and a correction amplifier will be explained against a differential servo system not using them.

Figure 11:
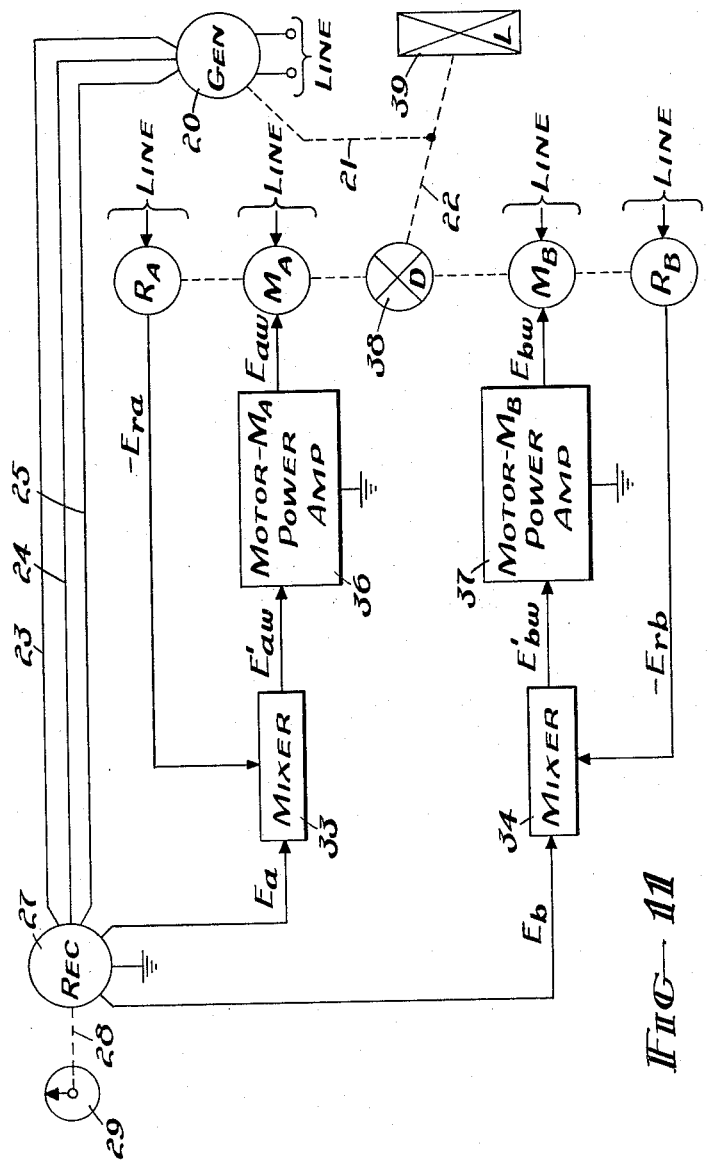
Figure 11 is a block diagram of a differential servo system not having some of the components shown in Figures 1 and 2.

In the "simplified system" of Figure 11, the receiver output voltages $E_a$ and $E_b$ are connected to mixers 33 and 34, respectively, which also receive the respective rate voltages $E_{ra}$ and $E_{rb}$. Of course, resistors $r_o$ are not used in these mixers. The mixer outputs are voltages $E_{aw}'$ and $E_{bw}'$ which are provided to identical power amplifiers 36 and 37. Voltages $E_{aw}'$ and $E_{bw}'$ are the same as voltages $E_{ao}'$ and $E_{bo}'$ except that in Formulas 3 and 5 the $E_o$ terms are deleted. Thus, power amplifier 36 provides an output voltage $E_{aw}$ to motor $M_A$. If the rate generator voltages are neglected, power amplifier voltages $E_{aw}$ and $E_{bw}$ will have the same form as voltages $E_a$ and $E_b$, respectively, shown in Figure 6. Power amplifier 37 drives motor $M_B$.

Figure 9:
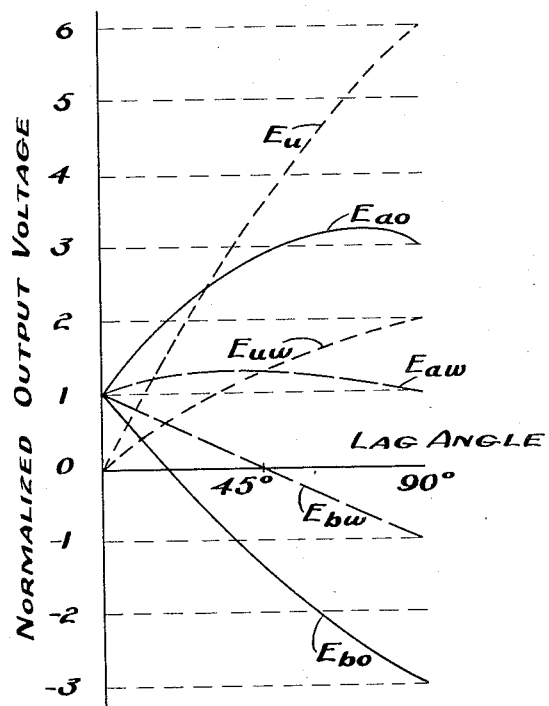
Figures 9 and 10 are graphs which compare various types of error voltage systems utilizing differential motors.

A first comparison will assume a situation where the gain of the amplifiers in both the "simplified system" and the "corrected system" is unity and will use Figure 9.

A second comparison will assume a situation where the three amplifiers in the "corrected system" each remain with a voltage gain of unity; while, on the other hand, the two amplifiers in the "simplified system" each have their voltage gain increased to three. The second comparison will be explained with the aid of Figure 10.

In the first comparison of Figure 9, curves $E_{ao}$, $E_{bo}$, and $E_u$ pertain to the "corrected system," with its amplifiers having unity gain; while curves $E_{aw}$, $E_{bw}$, and $E_{uw}$ pertain to the "simplified system," with its power amplifiers also having unity gain. Curves $E_{ao}$ and $E_{bo}$ represent the voltages provided to the respective differential motors in the corrected system, and curve $E_u$ represents the urge to the output shaft in this system. Similarly curves $E_{aw}$ and $E_{bw}$ represent the voltages provided to the respective motors in the simplified system; and curve $E_{uw}$ represents the urge to the output shaft in the latter system.

Thus, in Figure 9, it is noted that at a lag-angle of ninety degrees, the urge $E_u$ to load-shaft 22 in the corrected system is three times the urge $E_{uw}$ to the load-shaft in the simplified system. Furthermore, at all lesser lag-angles, the urge provided by the corrected system is correspondingly larger than the urge provided in the simplified system.

At zero lag-angle, the voltages to motors $M_A$ and $M_B$ are equal and the motors rotate at equal speeds to maintain load shaft 22 non-rotative.

Therefore, in the first comparison situation, both systems provide the same amount of energy to the motors at no-load (zero lag-angle); but when the motors are loaded (lag-angle other than zero), the corrected system provides approximately three times as much torque to the load as the "simplified system."

Figure 10:
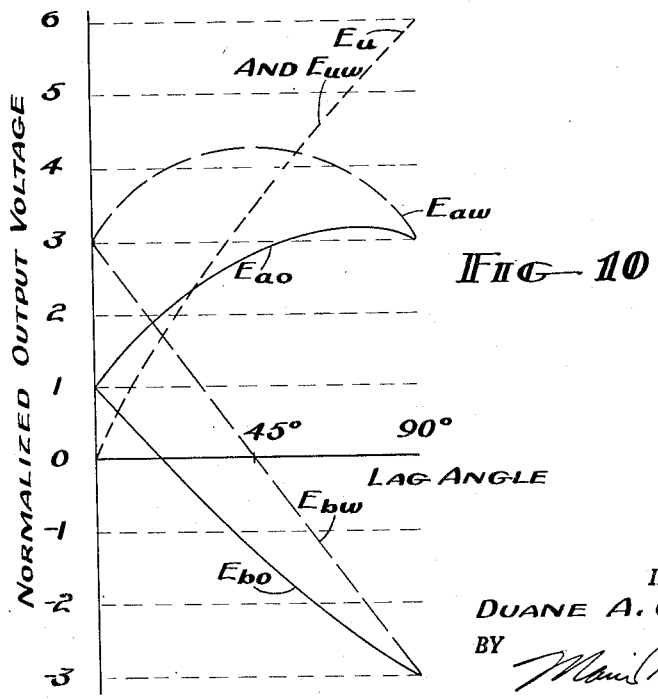

The second comparison situation is shown in Figure 10, where each of the amplifiers in the corrected system still have a gain of one; but the gain of each power amplifier in the simplified system is increased to three. Curves $E_{ao}$ and $E_{bo}$ represent the voltages to motors $M_A$ and $M_B$, respectively, in the corrected system; while curves $E_{aw}$ and $E_{bw}$ represent the voltages to motors $M_A$ and $M_B$, respectively in the simplified system. Here, each system provides the same urge to the load-shaft with change of lag-angle and a single curve represents the urges $E_u$ and $E_{uw}$ of both systems. Nevertheless, their operational characteristics are not the same; and they have some striking differences, which are very important in some applications of the systems. It is noted at zero lag-angle that the simplified system provides to each motor three times the voltage that is provided in the corrected system. Hence, in the simplified system at no-load (zero lag-angle), approximately three times as much energy is wasted as would be used in the corrected system; and the latter system therefore has approximately three times the efficiency while idling than is obtained with the simplified system. This is particularly important in applications of the systems where the input changes only occasionally.

Another advantage shown by the second comparison is that the corrected system provides less voltage stress on its motors to provide the same urge to the load. It is noted at forty-five degrees lag-angle in Figure 10 that voltage $E_{aw}$ reaches a peak that is 1.4 times the peak voltage provided to either motor in the corrected system. Therefore, the corrected system permits the use of differential motors with lower voltage ratings while still maintaining an equal amount of urge (torque) to the load.

Another very important advantage apparent in the second comparison is that in the corrected system the load is more equally divided between the two differential motors $M_A$ and $M_B$. For example, at forty-five degrees lag-angle in the simplified system $M_B$ receives no voltage while motor $M_A$ receives a maximum voltage and thus must supply all of the power to the load-shaft. In the corrected system at forty-five degrees lag-angle, both motors are provided with voltage and neither motor receives a peak voltage. In the corrected system, the position where the load is borne entirely by one motor occurs at a small lag-angle where the loading of the single motor is relatively small and is far from its rated load.

Furthermore, the invention provides means for controlling the urge to the differential motors by controlling the gain of the correction amplifier. The urge $E_u$ to load-shaft 22 may be derived mathematically using the above given Formulas 1 through 6 and is represented by the following formula, which assumes that power amplifiers 36 and 37 have equal gain (that is $G_a = G_b$):

$$E_u = G_a E_o'(1 + 2G_o) \quad (8)$$

Thus, increasing the gain of the single correction amplifier in the corrected system has almost the same effect upon the urge to the load as equally increasing the gain of both power amplifiers 36 and 37 in the simplified system.

A still further very important advantage of the corrected system is that, when the urge is increased by increasing the gain, $G_o$, of the correction amplifier, the no-load (zero lag-angle) voltage on the motors is not increased; and the system retains its high no-load efficiency. On the other hand, in the simplified system, the only way the urge can be increased is by increasing the gains $G_a$ and $G_b$ of the power amplifiers; and this proportionally increases the no-load (zero lag-angle) voltages on the motors to decrease the no-load efficiency of the simplified system.

Thus, the no-load speed of the differential motors $M_A$ and $M_B$ are controlled only by the gains $G_a$ and $G_b$ of the power amplifiers, and may be controlled in the corrected system by decreasing the gain of the power amplifiers 36 and 37 without affecting the urge which may be controlled by the gain of the correction amplifier. This cannot be done in the simplified system.

Therefore, it is possible in this invention to control the individual voltages to the differential motors and their urge to the load-shaft over the whole lag-angle gamut by adjusting the gains of the three amplifiers. The equalization of power between motors may be improved in the invention over that shown in Figure 10 by increasing the gain of correction amplifier 32 and decreasing the gain of power amplifiers 36 and 37. When the ratio of voltage $E_{ao}$ at ninety degrees of lag-angle to $E_{ao}$ at zero degrees of lag-angle is made large in the corrected system, motors $M_A$ and $M_B$ each receive almost equal loading throughout the gamut of lag-angles. This situation will further lower the no-load (zero lag-angle) rotating energy consumption of the motors and their gearing and will increase the efficiency of the system. It is therefore apparent that this invention provides an improved error voltage system in a differential type of follow-up apparatus wherein the error voltages are controlled in a manner that facilitates the operation of the system. It is seen that the invention provides a follow-up system which has a wide dynamic range and which is capable of smooth operation at extremely small input velocities. It is further apparent that the invention provides a differential servo system using a minimum amount of energy while idling the motors at zero lag-angle to greatly increase the efficiency of the system. Also, the invention equalizes the load on each motor over essentially the whole dynamic range of the system and lowers the voltage rating requirements of the motors.

Many changes, including widely different embodiments, can be made in the above construction of this invention by a man skilled in the art without departing from the scope of the invention. For example, the resistor combinations used in the mixers in Figure 5 may be replaced by transformer or inductor arrangements which will accomplish the same mixing function. It is therefore intended that all matter contained in the above description

What is claimed is:

1. In a follow-up system wherein an output shaft is driven by a differential device in alignment with an input shaft comprising, a lag-angle sensing means connected between said output shaft and input shaft, the sensing means providing a pair of output control voltages that vary with the lag-angle between said input and output shafts, the control voltages having equal magnitudes when said output shaft is aligned with said input shaft, a first mixer receiving said control voltages and providing an error voltage output that is the difference between their amplitudes, an error voltage correction amplifier with a predetermined gain connected to the output of the first mixer and providing a pair of output voltages having equal magnitudes, a second mixer connected to the output of said correction amplifier to receive one of the amplified error voltages and connected to the lag-angle sensing means to receive one of its control voltages, said second mixer adding the magnitudes of its received voltages to provide a composite output voltage, a third mixer connected to the sensing system to receive the other control voltage and connected to the correction amplifier to receive its other amplified error voltage, said third mixer subtracting the magnitudes of its received voltages to provide a composite output voltage, a first power amplifier having a predetermined gain connected to the composite output of said second mixer, a second power amplifier having a predetermined gain connected to the composite output of said third mixer, a first motor connected to the output of said first power amplifier and having its shaft coupled to one input of said differential device, and a second motor connected to the output of the second power amplifier and having its shaft coupled to the other input of said differential device, whereby the gain of said correction amplifier controls the urge to the output shaft without affecting the zero lag-angle speed of the motors.

2. A signal-mixing system for a servomechanism wherein an output shaft is driven by a pair of motors through a differential transmission to align with an input shaft comprising, a lag-angle sensing system connected between said input and output shafts and providing an output comprising a pair of control voltages, the magnitudes of the control voltages displaced phase-wise with respect to lag-angle variation and having equal magnitudes when said output shaft is aligned with said input shaft, first mixing means connected to the sensing means to receive and subtract the magnitudes of said control voltages from each other to provide difference output, correction voltage amplifying means connected to the first mixing means to receive the difference output and providing a pair of correction output voltages having the same magnitude, second mixing means connected to the sensing means and correction amplifying means to receive one of the control voltages and one of the correction voltages, the second mixing means adding the magnitudes of its received voltages to provide a composite output voltage, first power amplifying means connected between the second means and said first motor to receive and amplify and operate said motor by the received composite voltage, third mixing means connected to the sensing means and correction amplifying means to receive the other control voltage and the other correction voltage, the third mixing means subtracting its received voltages to provide a composite output voltage, and second amplifying means connected between the third mixing means and said second motor to receive and amplify and operate said motor by the received composite voltage, whereby the speed-torque characteristics of the differential motors may be precisely controlled with lag-angle variation by controlling the gains of the correction amplifier and the first and second power amplifiers.

3. A system as defined in claim 2 in which, rate voltage means are operated by said motors with the rate voltage outputs connected respectively to the second and third mixing means to alter the composite voltages in a manner that stabilizes the operation of said motors.

4. An error voltage system for a follow-up device wherein an output shaft is driven into alignment with an input shaft by a differential device operated by a pair of motors, the system comprising, a lag-angle sensing means providing a pair of alternating output control voltages that vary sinusoidally in root-mean-square magnitude with variation in lag-angle, said control voltages having their magnitude variations displaced phase-wise with respect to lag-angle variation, the control voltages having equal amplitudes and the same polarity at zero lag-angle, a first mixer connected to the output of said sensing means to receive said control voltages, the first mixer subtracting the amplitudes of said control voltages and having an output error voltage proportional to their difference, an error voltage correction amplifier having a predetermined gain connected to the first mixer to receive its output error voltage, said correction amplifier having a split output to provide a pair of opposite polarity amplified error voltages having equal magnitude, a second mixer connected to the outputs of the correction amplifier and the sensing means to receive one control voltage of the correction amplifier and one error voltage of the sensing means, the second mixer adding the amplitudes of its received voltages to provide a first composite output voltage, a third mixer connected to the outputs of the correction amplifier and the sensing means to receive the other control voltage and the other amplified error voltage, the third mixer subtracting the amplitudes of its received voltages to provide a second composite output voltage, a first power amplifier connected to the output of said second mixer to receive and amplify the first composite voltage, one of said motors connected to the output of the first power amplifier, a second power amplifier connected to the output of the third mixer to receive and amplify the second composite voltage, and the other of said motors connected to the output of the second power amplifier, whereby the urge provided to the output shaft is controlled by the gain of said correction amplifier without affecting the no-load speed of said motors.

5. An error voltage system of the type defined in claim 4 in which, the phase displacement of the magnitude variation of said control voltages with lag-angle variation is approximately ninety degrees.

6. An error voltage system of the type defined in claim 4 in which, a first rate generator is coupled to said one motor and has its rate signal output connected to the second mixer, the second mixer subtracting the first rate signal from the first composite voltage, a second rate generator is coupled to said other motor and has its rate signal output connected to the third mixer, and the third mixer subtracting the second rate signal from the second composite voltage.

7. An error voltage system for a follow-up device wherein an output shaft is driven into alignment with an input shaft by a differential device operated by a pair of motors, the system comprising, a lag-angle sensing means having a pair of alternating output control voltages that vary sinusoidally in root-mean-square magnitude with variation in lag-angle, said control voltages having their magnitude variations displaced phase-wise with respect to lag-angle variation, the control voltages having equal magnitudes but opposite polarity at zero lag-angle, a first mixer connected to the output of said sensing means to receive said control voltages, the first mixer adding the amplitudes of the received control voltages and having an output error voltage proportional to the difference in their magnitudes, an error voltage correction amplifier connected to the first mixer to receive its output error voltage, said correction amplifier having a pair of output voltages with equal amplitudes and the same polarity, a second mixer connected to the output of said correction amplifier and the output of said sensing means to receive one of the control voltages and one of the error voltages, the second mixer adding the amplitudes of its received voltages to provide a first composite output voltage, a third mixer connected to the output of said correction amplifier and the output of said sensing means to receive the other control voltage and the other error voltage, the third mixer adding the amplitudes of its received voltages to provide a second composite output voltage, a first power amplifier connected to the output of said second mixer to receive and amplify the first composite output voltage, one of said motors connected to and driven by the output of the first power amplifier, a second power amplifier connected to the output of said third mixer to receive and amplify the second composite output voltage, and the other of said motors connected to and driven by the output of the second power amplifier, whereby the urge provided to the output shaft is controlled by the gain of said correction amplifier without affecting the no-load speed of said motors.

8. An error voltage system of the type defined in claim 7 in which, the phase displacement of the magnitude variation of said control voltages with lag-angle variation is approximately ninety degrees.

9. An error voltage system of the type defined in claim 7 in which, a first rate generator is coupled to said one motor and has its rate signal output connected to the second mixer, the second mixer subtracting the first rate signal from the first composite voltage to stabilize the operation of said one motor, a second rate generator is coupled to said other motor and has its rate signal output connected to the third mixer, and the third mixer subtracting the received rate signal from the second composite voltage to stabilize the operation of said other motor.

10. A follow-up system wherein an output shaft is driven into alignment with an input shaft by a differential device operated by a pair of motors, the system comprising, a lag-angle sensing means having a pair of output control voltages that vary in magnitude with variation in lag-angle, said control voltages having their magnitude variations displaced phase-wise with respect to lag-angle variation, the control voltages having equal magnitudes at zero lag-angle, a first power amplifier connected between one output of the sensing means and one of said motors to amplify one of the control voltages and drive the motor, and a second power amplifier connected between the other output of the sensing means and the other of said motors to amplify the other control voltage and drive the motor, whereby the motors continue rotating while the follow-up system is at zero lag-angle.

11. A follow-up system wherein an output shaft is driven into alignment with an input shaft by a differential device operated by a pair of motors, the system comprising, a lag-angle sensing means having a pair of output control voltages that vary sinusoidally in root-mean-square magnitude with variation in lag-angle, said control voltages having their magnitude variations displaced phase-wise with respect to lag-angle variation, the control voltages having equal magnitudes at zero lag-angle, a first rate generator coupled to one of said motors to provide a first rate signal output voltage, a second rate generator coupled to the other of said motors to provide a second rate signal output voltage, a pair of mixers, one of the mixers connected to the sensing means and the first rate generator to receive and subtract the first rate signal from one of the control voltages to provide the mixer output, the other mixer connected to the sensing means and the second rate generator to receive and subtract the second rate signal from the other control signal to provide the mixer output, first amplifier means connected to the output of the one mixer to receive and amplify its output, second amplifier means connected to the output of the other mixer to receive and amplify its output, said one motor connected to the output of the first amplifier means, and said other motor connected to the output of the second amplifier means, whereby the motors continue rotating while the follow-up system is at zero lag-angle.

12. Split voltage output control means in a follow-up system having a differentially operated output shaft that follows an input shaft wherein there is a generator having a rotor coupled to one of said shafts to provide an output signal from its stator that varies with the position of the shaft and receiver having stator means that is connected to the output of the generator and rotor means coupled to the other shaft, the improvement comprising, a pair of coils that are angularly displaced from each other with respect to the stator means to form said receiver rotor means, the rotor coils providing separate output control voltages, whereby the magnitudes of the control voltages are displaced phase-wise with respect to lag-angle variation of the follow-up system.

13. A lag-angle sensing means to sense the lag-angle between the input shaft and the output shaft in a follow-up system having its output shaft driven by a differential device through a pair of motors, the sensing system comprising, means connected between said input and output shafts to sense an angular difference between them, said means providing a pair of output control voltages that vary in magnitude with lag-angle variation, and the magnitudes of the output voltages displaced phase-wise with respect to lag-angle variation.

14. A lag-angle sensing means to sense the lag-angle between the input and output shafts of a follow-up system having its output shaft driven by a differential device through a pair of motors, the sensing system comprising, generator and receiver means connected between said input and output shafts to sense the angular difference between them, said receiver means providing a pair of alternating output voltages that vary in root-mean-square magnitude with lag-angle variation, the magnitudes of the output voltages being displaced phase-wise from each other with respect to lag-angle variation by approximately ninety degrees, and said output voltages having equal magnitudes at zero lag-angle.

15. A lag-angle sensing means to sense the lag-angle between the input and output shafts of a follow-up system having its output shaft driven by a pair of motors through a differential transmission, the sensing means comprising, generator means including a single synchro, receiver means including a pair of synchros with their rotors coupled together, the rotors of said receiver means and generator means mechanically coupled to the output and input shafts, the stators of the receiver synchros connected in parallel, the stator of the generator synchro connected to the parallel connected receiver stators, the receiver rotors coupled with an angular spacing between them which is a predetermined number of electrical degrees with respect to the null position provided by a single generator signal, and output control voltages for the sensing means taken across the rotors, whereby the magnitudes of the control voltages are displaced phase-wise with respect to lag-angle variation.

16. A lag-angle sensing means as defined in claim 15 in which, the angular spacing between the receiver rotors is ninety electrical degrees, the receiver rotors are connected together at one of their ends which is grounded, and the separate control voltages are taken from the unconnected ends of the rotor.

17. A larg-angle sensing means to sense the lag-angle between the input and output shafts of a follow-up system having its output shaft driven by a pair of motors through a differential transmission, the sensing means comprising, generator means including a single resolver with a single coil rotor, receiver means including a single resolver with a double coil rotor, the coils of the receiver rotor displaced from each other by a predetermined number of electrical degrees, the coils of the receiver rotor each having one end grounded, the generator and receiver stators electrically connected together, and the generator and receiver rotors mechanically coupled to said input and output shafts respectively, whereby the magnitudes of the output voltages vary with lag-angle.

18. A follow-up system having coarse and fine lag-angle sensing means wherein an output shaft is driven into alignment with an input shaft by a differential transmission driven by a pair of motors, the system comprising, said coarse lag-angle sensing means coupled between said input and output shafts and having a pair of output control voltages that vary in root-mean-square magnitude with variation in lag-angle, said coarse sensing means control voltages having their magnitudes displaced phase-wise with respect to lag-angle variation, said fine lag-angle sensing means coupled between the input and output shafts with a step-up transmission ratio with respect to the coarse means and having a pair of output control voltages that vary in root-mean-square magnitude with variation in lag-angle, said fine sensing means control voltages having their magnitude variations displaced phase-wise with respect to lag-angle variation, the control voltages in each sensing system having equal magnitudes at zero lag-angle, a selector circuit including double-pole double throw switching means for selectively connecting the fine and coarse sensing means into the follow-up system, the selector circuit having input means connected to the output of the coarse sensing means to sense the difference between the magnitudes of its output control voltages, actuating means in the selector circuit for actuating selector switching means in response to the selector input means when the input difference voltage exceeds a predetermined amount, the switching means connecting the output of the fine sensing means into the system when the input difference voltage is below the predetermined amount and only connecting the coarse sensing means when the input difference voltage exceeds the predetermined amount, a first mixer connected to the ouput of the selector circuit to receive the selected control voltages and to subtract their magnitudes to provide an error output voltage, a correction amplifier having a predetermined gain connected to the output of the first mixer and providing a pair of amplified error voltages having the same magnitude, a second mixer connected to the selector circuit and to the correction amplifier to receive one of the selected control voltages and one of the amplified error voltages, the second mixer adding the magnitudes of the received voltages to provide a first composite output voltage, a third mixer circuit connected to the selector circuit and the correction amplifier to receive the other selected control voltage and the other amplified error voltage, the third mixer circuit subtracting the magnitudes of the received voltages to provide a second composite output voltage, a first power amplifier connected between one of said motors and the composite output of the second mixer, a second power amplifier connected between the composite output of the third mixer and the other of said motors, whereby a wide dynamic range is provided by the follow-up system.

19. A follow-up system as in claim 18 in which, a first rate generator is coupled to said one motor and has its output connected to the second mixer to subtract from the mixer output, a second rate generator is coupled to the other motor and has its output connected to the third mixer to subtract from the mixer output, and the magnitudes of the control voltages in each sensing system are displaced phase-wise by approximately ninety degrees with respect to the internal lag-angle of each sensing system.

20. A follow-up system wherein an output shaft is driven into alignment with an input shaft by a differential transmission driven by a pair of two phase motors, the system comprising, fine and coarse lag-angle sensing means, each of said sensing means independently coupled between the input and output shafts, the fine sensing means coupled to the shafts with a higher transmission ratio than the coarse sensing system, each sensing system providing a pair of control voltages that vary with lag-angle, the magnitudes of each pair of control voltages displaced phase-wise from each other with respect to lag-angle variation, and the control voltages of each sensing means having opposite polarity and equal magnitude at zero lag-angle; a selector circuit having a relay-operated switch having one set of normally open contacts connected respectively to the outputs of the coarse sensing means and the other set of normally closed contacts connected respectively to the outputs of the fine sensing means, the input means of the selector circuit comprising means for sensing the difference between a pair of received voltages, said input means connected to the outputs of said coarse sensing means to receive its pair of control voltages, actuating means in said selector circuit connected between the relay and the input means to switch said relay when the difference between the coarse control voltages exceeds a predetermined amount to thereby disconnect the fine control voltages and connect the coarse control voltages to the switching poles of the relay, a first mixer connected to the poles of said selector circuit switch to receive the control voltages from the connected sensing means, the first mixer having means for subtracting the received control voltages to provide a difference output, a correction amplifier having a predetermined gain connected to the output of said first mixer and providing a pair of unbalanced output error voltages, a second mixer connected to the output of the correction amplifier and to one of the poles of the selector switch to receive one of the error voltages and one of the connected control voltages, the second mixer having means for algebraically adding its received voltages to provide a first composite output voltage, a third mixer connected to the output of the correction amplifier and to the other pole of the selector switch to receive the other error voltage and the other connected control voltage, the third mixer algebraically adding its received voltages to provide a second composite output voltage, a first power amplifier having a predetermined gain with its input connected to the second mixer to receive its composite output voltage, one field coil of one of said motors connected to the output of said first power amplifier, a second power amplifier having a predetermined gain with its input connected to the third mixer to receive its composite output voltage, one field coil of the other of said motors connected to the output of the second power amplifier, and an alternating voltage source connected to the remaining coils of said two-phase motors and to said sensing means to provide operating power, whereby the gain of the correction amplifier controls the urge to the output shaft without affecting the zero lag-angle speed of the motors while the gain of the power amplifiers controls the zero lag-angle speed of the motors.

21. A follow-up system as defined in claim 20 in which a first rate generator is coupled to said one motor, the first rate generator having its output connected to the input of the second mixer to stabilize said one motor, a second rate generator is coupled to said other motor, the second rate generator having its output connected to the input of the third mixer to stabilize said other motor, and the rate generators connected to the alternating line source to receive energization.

22. A follow-up system as defined in claim 20 in which, the root-mean-square magnitude of the control voltages of the fine sensing means vary sinusoidally with lag-angle variation and are displaced phase-wise with respect to its internal lag-angle variation by approximately ninety degrees, and the root-mean-square magnitudes of the coarse sensing means vary sinusoidally with its internal lag-angle variation and are displaced phase-wise with respect to its internal lag-angle variation by approximately ninety degrees.

23. A selector circuit for a differential transmission follow-up system having coarse and fine sensing means wherein each sensing means provides a pair of output control voltages that vary in magnitude with lag-angle variation, the selector circuit comprising, input means connected to the coarse sensing means and receiving its pair of output control voltages, the input means providing an output voltage that is the difference between the magnitudes of the coarse control voltages, switching means for alternately connecting the fine sensing means control voltages and the coarse sensing means control voltages to the output of the selector circuit, amplifying means connected to and amplifying the difference output of the input means, actuating means connected between the amplifying means output and the switching means to actuate the switching means in response to the difference output of the input means, and the switching means connecting the fine sensing means control voltages to the selector circuit output when the output voltage of the input means is between zero and a predetermined value and connecting the coarse sensing means control voltages to the selector circuit output when the output voltage of the selector means exceeds the predetermined value.

24. A selector circuit for a differential transmission follow-up system having coarse and fine sensing means wherein each sensing means provides a pair of output control voltages that vary in magnitude with lag-angle and have opposite polarity at zero lag-angle, the selector circuit comprising, a pair of resistors of equal value connected serially across the outputs of the coarse sensing means to receive its control voltages at opposite ends, amplifying means having its input connected to the common point between said resistors, a relay having double pole, double throw contacts with one set of normally closed contacts connected respectively to the fine sensing means control voltages and with the other set of normally open contacts connected respectively to the coarse sensing means control voltages, and rectifying means connected between the amplifying means output and relay input, whereby the relay will switch contacts when the voltage at the common point of the resistors exceeds a predetermined value to disconnect the fine control voltages and connect the coarse control voltages.

References Cited in the file of this patent

UNITED STATES PATENTS

| | | |
|---|---|---|
| 1,436,280 | Minorsky | Nov. 21, 1922 |
| 2,676,289 | Wulfsberg et al. | Apr. 20, 1954 |